3,375,637
HOT GAS PURIFICATION
Franz Kaess, Traunstein, and Otto Kick, Hart (Alz), Germany, assignors to Suddeutsche Kalkstickstoff-Werke Aktiengesellschaft, Trostberg, Upper Bavaria, Germany
Filed Mar. 11, 1966, Ser. No. 533,481
Claims priority, application Germany, Mar. 12, 1965, S 95,934
3 Claims. (Cl. 55—90)

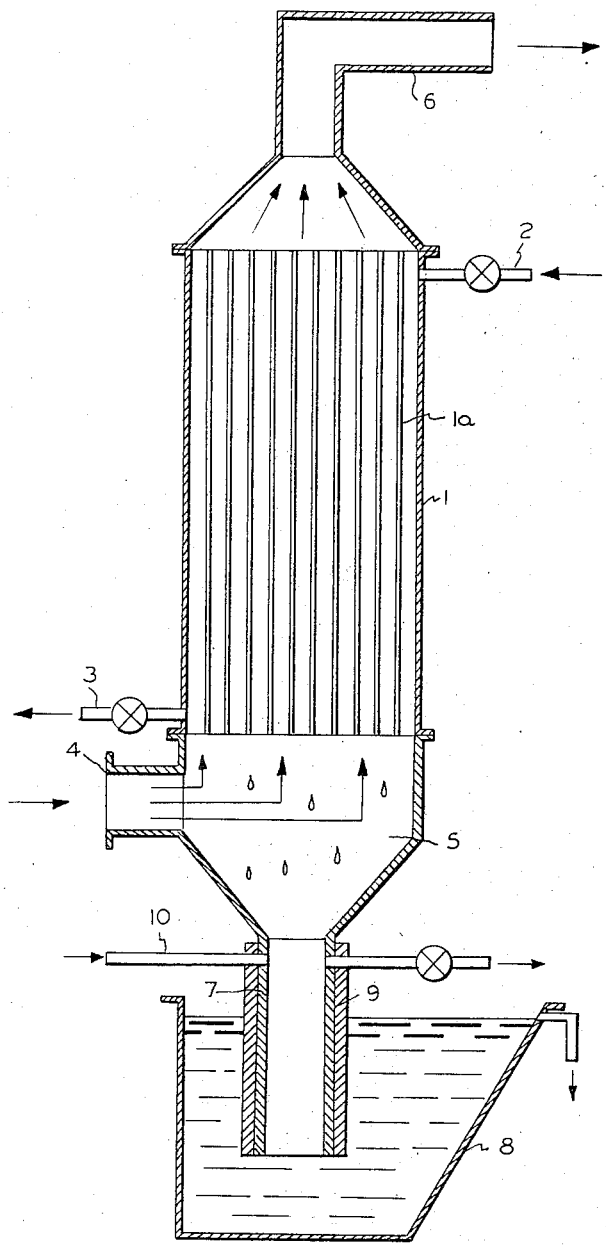

This invention relates to the purification of hot waste gases and more particularly of waste gases as produced in many metallurgical and electrothermic processes.

In addition to considerable amounts of essentially inorganic dusts, such gases contain various organic compounds of widely differing boiling and melting points, as well as some poisonous ingredients. Organic impurities of such waste gases are particularly distillation and cracking products like those known from the gasification of bituminous coal. For instance, closed 40 mw. carbide ovens operated at a temperature of about 2500° C. develop about 5000 Nm.³/hour of waste gases which contain about 0.4 to 1 g./Nm.³=50 to 150 kg./day of napthalene, anthracene, and chrysene.

As coke, anthracite, and tar patch generally constitute the starting materials for the residual distillation, the heavy fractions which at room temperature are viscous or solid, far exceed in said group of tar derivatives the proportion of light hydrocarbons.

Among the poisonous components of the waste gases which, in a wet purification, would contaminate the waste water, there are hydrocyanic acid (600 to 1200 mg./Nm.³, essentially in the form of cyanides), arsenides, ammonia, and others. In comparison, the biologically permissible residual content of cyanide ions is of the order of magnitude of 0.1 to 1 mg. per cubic meter of waste water.

In the conventional purification methods, the oven gases are subjected to a dry-purification and then treated in spray towers or disintegrators to reduce the solids content to the purity of 12 to 20 mg. of solids per Nm.³. Thereby, great quantities of waste water are obtained which are contaminated with poisonous substances and which have to be decontaminated by expensive and difficulty controlled procedures.

It is also known to use oil-impregnated air filters, and indirectly cooled separators. They are not successful because oil-impregnated filters complicate subsequent processing, and in both cases it is not possible to control the clogging and caking problems. Passing of the gases previously through tar electro filters would help but is uneconomic. It is a principal object of the invention to provide a process which produces economically a high purification degree without direct contact of the gases with water or wash oil and without substantial clogging of the separator surfaces.

Other objects and advantages will be apparent from a consideration of the specification and claims.

According to the invention, we employ a vertical cooler provided with narrowly divided precipitating surfaces. The gases are passed through said cooler upwardly while the upper cooling zone is maintained at a lower temperature than the lower cooling zone. In this way, condensate flows from the upper cooling zone into the lower zone, and the part of the condensate not again vaporized in said lower zone is withdrawn together with precipitated residual dust.

The non-volatile hydrocarbons precipitate at the lower cooling zone while the light hydrocarbons condense only at the upper cooling zone. Due to the narrow division of the cooler and low rate of flow, there adhere at the lower cooling zones, in addition to the less volatile heavy hydrocarbons, also the residual dust particles of the waste gases in form of deposits. The down flowing condensate of the upper cooling zone washes said deposits off the lower zones of the cooler, whereby organic components are dissolved. While the down flowing deposits pass the gas entry space as droplets, the volatile components are partially volatized again and pass into the gas, while the heavy hydrocarbons are completely discharged through the heated discharge tube.

The recondensation of the light hydrocarbons in the upper cooling zone produces the copious flow of condensate required for the continuous removal of the deposits. In this way, the more volatile hydrocarbons are enriched in the separator, and the solid deposits and viscous condensation products are completely removed from the precipitation surfaces. By suitable control of the cooling, depending on the composition of the waste gases, the more volatile hydrocarbons may be either recycled or withdrawn from the lower portion of the cooling zone in liquid state, together with the condensate of the less volatile hydrocarbons.

It is important to ensure by a suitable temperature control that there is on the entire precpitation surface a continuous gravitational downward flow of the condensate which is capable of dissolving or washing off the organic precipitates which contain embedded the viscous and solid dust particles The gas current flowing upwardly counter to the flow of the condensate has preferably a speed of about 5 m./sec. because at higher rates of flow the sweeping forces, due to the gas friction, may interfere with the flow-off of the light condensate.

In the purification of the waste gases of a carbide oven plant, we have found suitable a cooling surface up to a height of max. 6 m. with a restriction of the cross section at the cooling element of 2–5 cm. $\phi$. By the narrow division of the cooling faces, it is ensured that also the tar substances, which are present as mist, are substantially precipitated at the cooling surfaces already wetted by surface condensation. As shown in commercial production, the purification of the waste gases is good enough to allow their utilization as rinsing medium in a preceding dust filter without the risk of clogging said filter. Said gas purity exceeds the purity required for the use in gas engines or burners, i.e. it is below 20 mg. solids/Nm³.

In the precipitation of the residual dust particles and the difficultly volatile hydrocarbons, the dust particles act at the same time as condensation nuclei. A further advantage of the process is the possibility of a steady drainage of the viscous condensate through an additionally heated drain pipe. The condensation product obtained in concentrated form can then be economically utilized, which in a wet purification is not possible without considerable apparative expenditures.

It is a further advantage of a plant using the new purification process that the pressure loss is only 30–45 mm. water column while the conventional plants, except those using electrostatic precipitation, have a loss which is a multiple of said figure.

The following example is given to illustrate the invention.

Example

In the operation of a closed electric furnace with 40 mw. power input for the production of calcium carbide, about 5000 Nm.³/hour of waste gases leave the furnace at a temperature of 600–800° C. with a dust content of about 100 g./Nm.³ A ceramic hot gas filter reduces the dust to a content of max. 150 mg./Nm.³

The hot waste gases having a temperature of about 200° C. pass into the gas entrance space situated at the bottom of an indirectly cooled single stage separator or cooler where a temperature of 100 to 150° C. is maintained (the temperature must be above the boiling point of the light hydrocarbons and above the solidification point of the drained mixture). The temperature in the upper cooling zone is so controlled as to be below the boiling point but not below the solidification point of the light hydrocarbons; it is between 25 and 35° C. As far as the temperature is below the dew point, also water is condensed which removes the greater part of hydrocyanic acid, ammonia, etc. in dissolved form. Due to the temperature gradient between the upper cooling zone and the gas inlet space, a medium temperature will obtain in the lower part of the cooler. The drain pipe connecting the cooler to a collecting tank is maintained at a temperature of 80° C.

The more volatile organic compounds condensed in the upper strongly cooled zone flow down over the walls of the lower less strongly cooled zone and wash the deposits of dust and less volatile hydrocarbons off said wall; thereby, part of the organic compounds is dissolved. The down flowing condensates pass as drops into, and through, the gas inlet space and finally into a drain pipe. The more volatile components return, in part, into the gaseous state. Only the components having a high boiling point are finally withdrawn and discharged.

The following table shows the hydrocarbon and dust content of the carbide oven gases prior to, and after, the passage through the separator.

|  | Before passage | After passage |
|---|---|---|
| Hydrocarbons, mg./Nm.$^3$ | 300–1,000 | 40 |
| Dust, mg./Nm.$^3$ | 150 | 5 |

Similar results are obtained in the treatment of waste gases from the electrothermic production of ferro and other alloys and from the electrosteel production.

An apparatus suitable for carrying out the invention is shown in the accompanying drawing.

In the drawing, the reference numeral 1 designates a cooler equipped with closely spaced vertical cooling ribs 1a. Cooling medium enters through line 2 and leaves the cooler through line 3. The gases coming from a dust filter, e.g. carbide oven waste gases, and which may contain still about 150 mg./Nm.$^3$ of fines and dust and about 0.3 to 1.0 g./Nm.$^3$ of organic compounds and may have a temperature of 150 to 200° C., enter through line 4 into the bottom chamber 5 of the cooler, which has a temperature of about 100 to 150° C., and pass upwardly through the cooler in countercurrent to the cooling medium. They are withdrawn by an overhead line 6 as pure gas of a temperature of about 25 to 30° C. containing about 40 mg./Nm.$^3$ of organic substances and about 5 mg./Nm.$^3$ solids.

The condensate is withdrawn from chamber 5 by a drain pipe 7 and collected in a container 8. The drain pipe is provided with a heating jacket 9 which receives heating medium through line 10. The drain pipe 7 is maintained at a temperature of about 80° C. so that the collected liquid in the collecting vessel 8 will have a temperature of about 40° C.

The temperature and rate of flow of the cooling medium is so adjusted that lighter hydrocarbons are condensed in the upper third of the cooler while the heavier hydrocarbons are condensed in the lower third of the cooler and fall as droplets into the drain pipe 7.

We claim:
1. An indirect cooling method for removing low boiling and high boiling organic constituents and residual dust from prepurified hot waste gases of electric furnaces comprising passing said gases upwardly through a cooling zone comprising narrowly divided cooling surfaces, cooling said surfaces in the upper part of said zone to a temperature at which said low boiling constituents are substantially condensed, cooling said surfaces in the lower cooling zone to a temperature at which said high boiling constituents are substantially condensed, thereby precipitating dust contained in the gases, volatizing part of said condensate of the upper cooling zone in said lower cooling zone producing a continuous reflux of said low boiling constituents, adjusting the rate of flux of the gases and the temperature in said cooling zones to ensure sufficient reflux of said low boiling constituents to remove continuously precipitated dust, and continuously withdrawing the unvolatilized part of the condensate from said lower cooling zone together with said dust.

2. The method as claimed in claim 1 comprising passing the gases through the cooling zone at a rate of about 5 m./sec.

3. The method as claimed in claim 2 wherein said waste gases are prepurified carbide oven gases containing about 0.4 to 1 g./Nm.$^3$ of naphthalene, anthracene, and chrysene, having a dust content of max. 150 mg./Nm.$^3$, and having a temperature of about 200° C., comprising adjusting the temperature of said upper cooling zone to about 25–30° C., and the temperature of said lower cooling zone to about 100–150° C., and adjusting the gas flow to a rate ensuring a temperature of said withdrawn condensate of about 80° C.

References Cited

UNITED STATES PATENTS

| 575,714 | 1/1897 | Heinzerling | 55—27 X |
| 1,905,053 | 4/1933 | Powell | 55—23 X |
| 2,067,349 | 1/1937 | Schuftan | 55—80 X |
| 2,708,490 | 5/1955 | Guinot | 55—20 |
| 2,720,936 | 10/1955 | Beu. | |

SAMIH N. ZAHARNA, *Primary Examiner.*

REUBEN FRIEDMAN, *Examiner.*

J. ADEE, *Assistant Examiner.*